June 27, 1967  B. P. GREEN ETAL  3,328,799
AUTOMATIC RADIO DIRECTION FINDER
Filed May 4, 1964  3 Sheets-Sheet 1
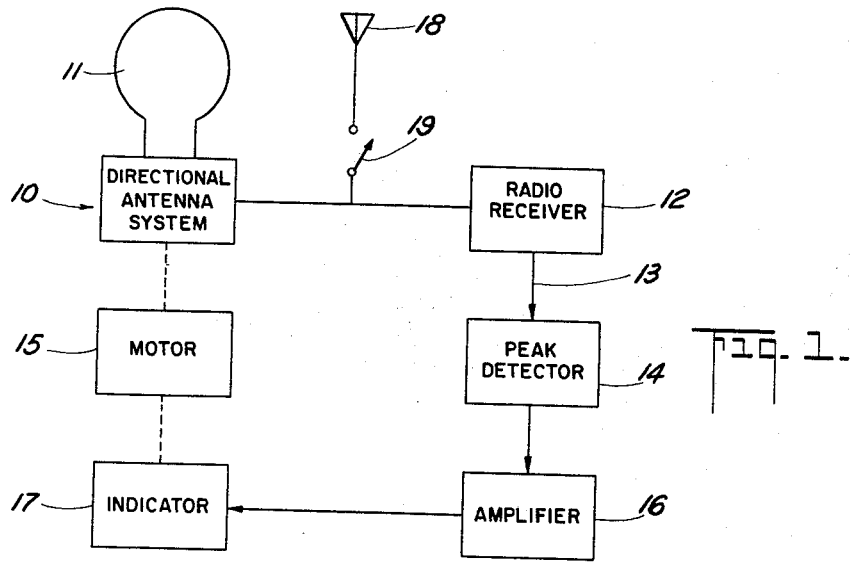
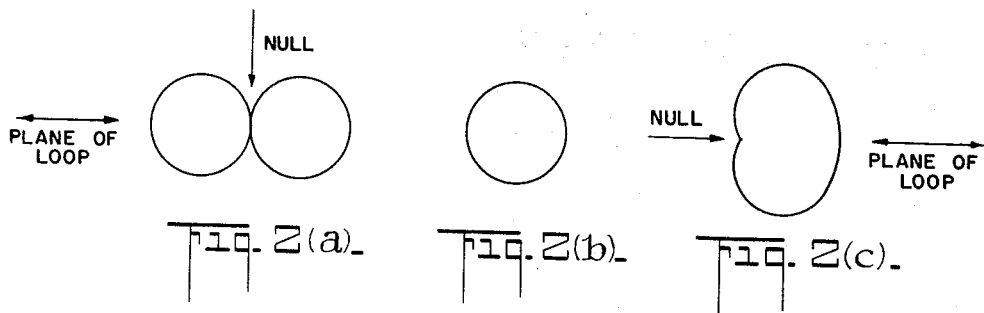
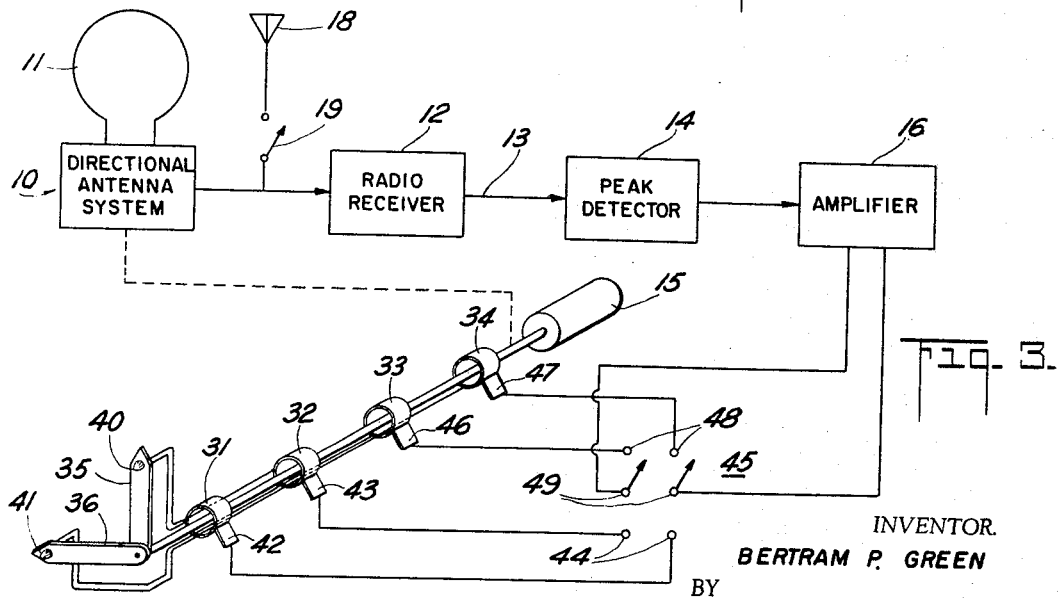
INVENTOR.
BERTRAM P. GREEN
BY
GEORGE PHILLIPS
AGENT

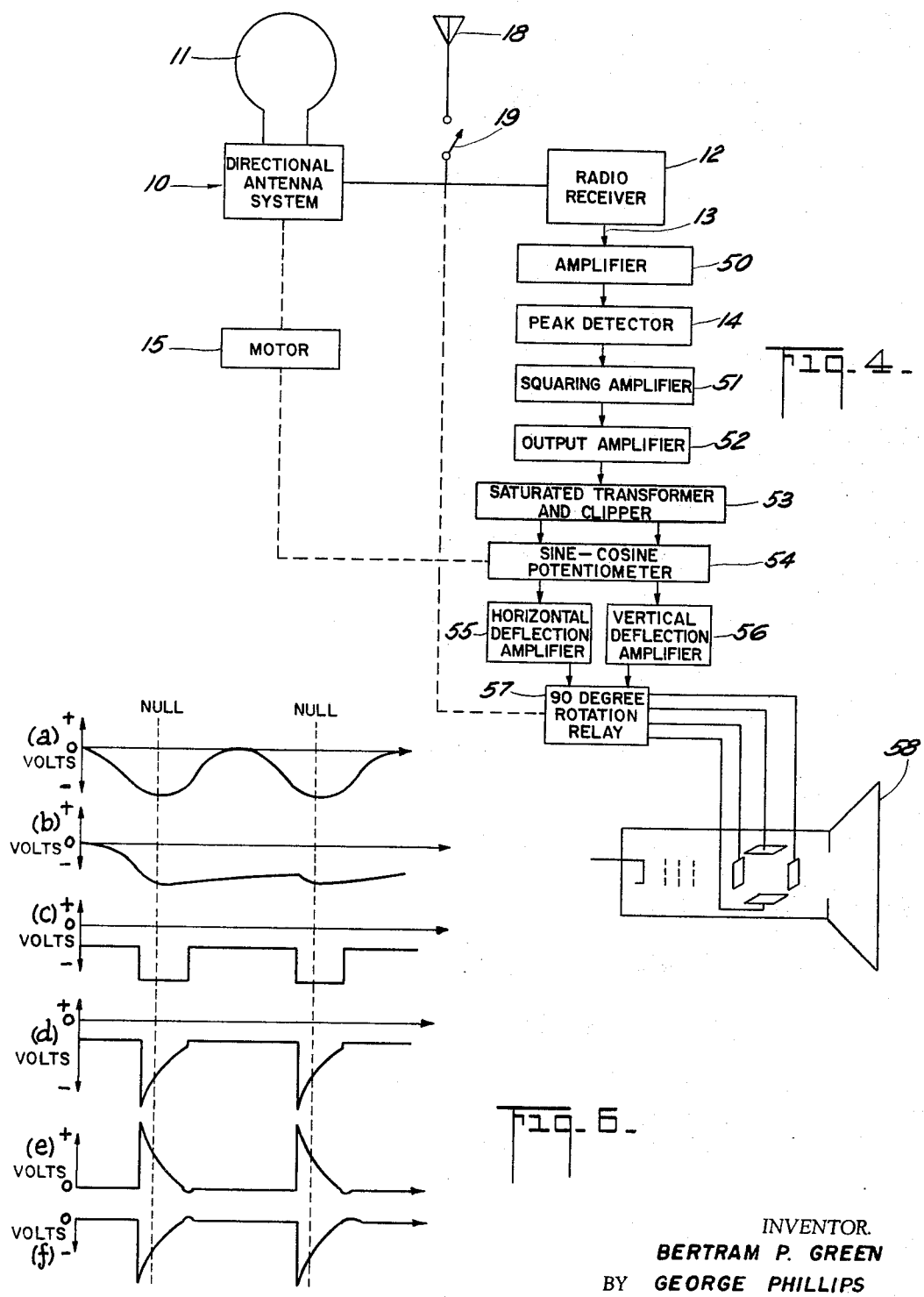

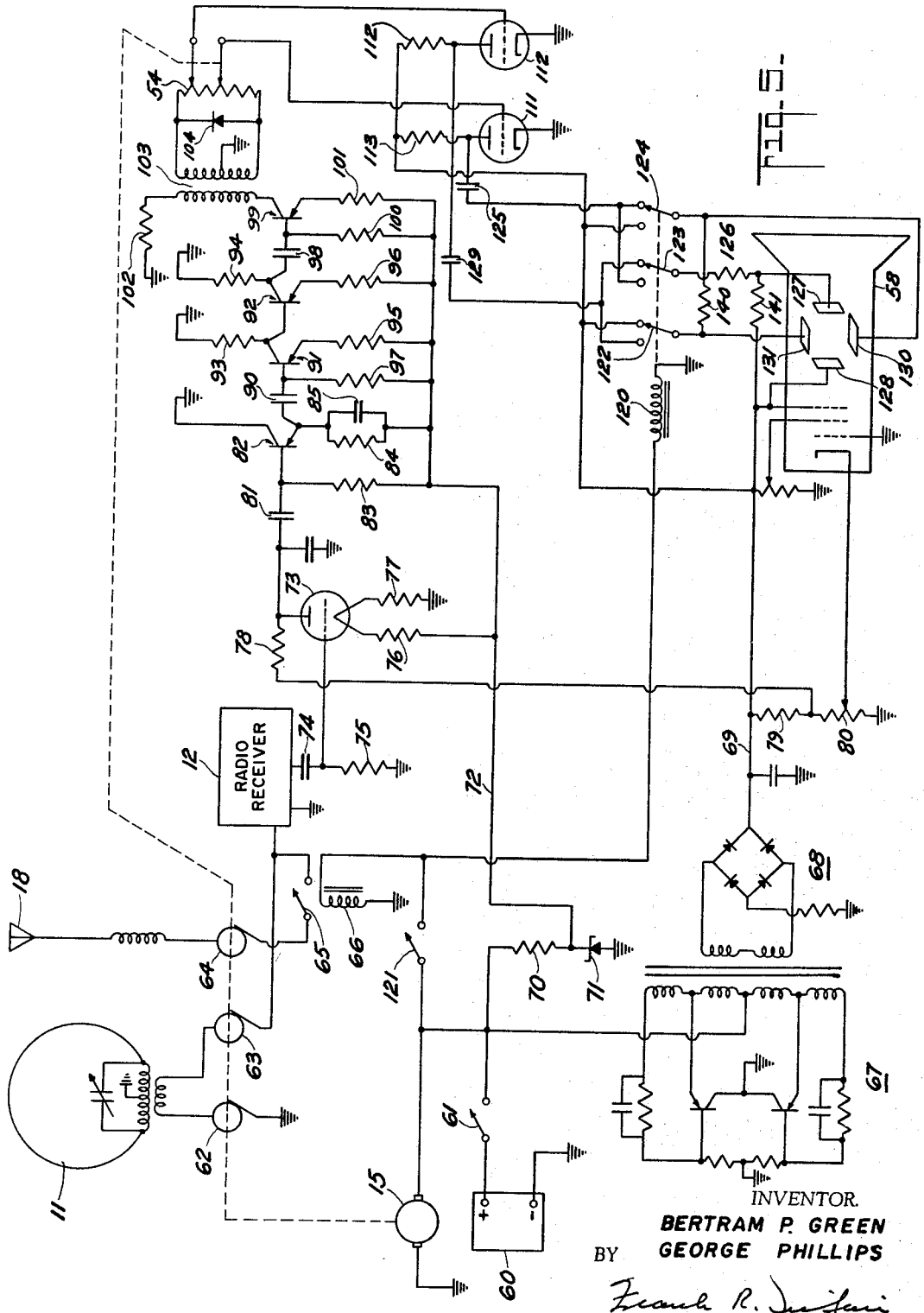

United States Patent Office 3,328,799
Patented June 27, 1967

---

3,328,799
AUTOMATIC RADIO DIRECTION FINDER
Bertram P. Green, Hicksville, and George Phillips, Uniondale, N.Y., assignors to North American Philips Company, Inc., New York, N.Y., a corporation of Delaware
Filed May 4, 1964, Ser. No. 364,543
3 Claims. (Cl. 343—118)

This invention relates to a radio direction finding system, and more particularly to a radio direction finding system of the type wherein the direction of maximum reception of a directional antenna is continuously automatically varied in order to obtain an automatic indication of the direction of origin of received signals.

While automatic radio direction finding systems are well known, such equipment is generally not adapted for use on small vehicles, such as small boats or light planes, due to such factors as size and power requirements, as well as the cost of the equipment.

It is therefore an object of this invention to provide an automatic radio direction finder especially useful for use on small vehicles.

It is a further object of this invention to provide an economical automatic radio direction finder requiring a minimum operating power, and having a minimum size.

A still further object of this invention is to provide an automatic direction finder satisfying the above objects, in which the indication of the direction of origin of the radio signals is accurate and easily read.

According to the invention, an automatic direction finding system is provided which employs an antenna having a directional antenna, such as a loop antenna, connected to a conventional radio receiver adapted to provide a DC output voltage which varies with signal strength. The directivity pattern of the antenna is continuously varied, for example, by continuously rotating a loop antenna, so that the receiver output voltage has cyclic variations. Means are provided for detecting the peaks of the cyclic voltage corresponding to the nulls in the antenna pattern, and a pulsatory voltage is derived from the peak detected signals. For example, a pulse may be produced each time a null of the antenna pattern is in the direction of the signals to be received. An indicator is coupled to the means for varying the directivity pattern of the antenna, and the pulsatory signals are applied to the indicator so that the indicator shows the relative position of the antenna at each occurrence of a pulse signal. The indicator may thus be calibrated to show the actual direction of origin of the signals.

Other objects and features of the invention will become apparent from the following description taken in conjunction with the accompanying drawings, in which:

FIG. 1 is a block diagram of a radio direction finding system according to the present invention;

FIGS. 2(a), 2(b) and 2(c) are diagrams of the directivity patterns of a loop antenna, a sensing antenna, and a combined loop and sensing antenna, respectively, that may be employed in the system of FIG. 1;

FIG. 3 is a block diagram of a radio direction finding system according to the invention and illustrating in more detail one form of indicating device that may be employed;

FIG. 4 is a more complete block diagram of a radio direction finding system according to the invention, wherein a cathode ray tube is employed as the indicating device;

FIG. 5 is a circuit diagram of the radio direction finding system of FIG. 4; and FIG. 6 illustrates the waveforms of signals occurring at various points in the circuit of FIG. 5.

Referring now to the drawings, and more particularly to FIG. 1, a directional antenna system 10, which may include a loop antenna 11, is connected to radio receiver 12 of conventional design. It is not intended, however, by describing the system of the invention for use with a loop antenna, that the invention be limited to this form of antenna. The receiver 12 includes means for providing DC output voltage which varies substantially proportionally with the signal strength of received signals, and this voltage is applied by way of lead 13 to a peak detector 14.

Means are also provided for continuously varying the direction of maximum signal reception of the antenna system. For example, in the system of FIG. 1, a motor 15 may be mechanically coupled to the antenna system 10 in order to continuously rotate the loop antenna. Due to the continuous rotation of the antenna, the receiver output voltage on lead 13 will have cyclic variations. These cyclic variations are peak detected in detector 14, and amplified in an amplifier 16 to produce a pulsatory signal responsive to the peaks of the cycles of the receiver output voltage.

The output pulse signals from the amplifier 16 are applied to an indicator 17, which will be described in more detail in the following paragraphs, and in order that the indicator be able to indicate the direction of origin of the received signals, the motor 15 is also mechanically coupled to the indicator.

The loop antenna 11 has a double lobe pattern, as shown in FIG. 2(a), with relatively sharp nulls normal to the plane of the loop. Thus, although sharp indications of direction may be obtained by detecting these nulls, the indication will be bidirectional when a loop antenna is used alone. Consequently, it is conventional in radio direction finding systems to employ a sensing antenna, such as antenna 18 of FIG. 1, and provide means such as switch 19 for connecting the sensing antenna to the input of the receiver. The sensing antenna has a circular pattern, as shown in FIG. 2(b), so that when the loop and sensing antennas are combined, to provide a directivity pattern having a single null as shown in FIG. 2(c), the null of the combined antennas is less sharp than the nulls of the loop antenna, and it is in the plane of the loop. Therefore, when using such an antenna system, the loop antenna is frequently used alone to obtain a sharp bidirectional indication, and the less sharp null of the combined loop and sensing antennas is employed to determine which of the two directions indicated is the actual direction of the signal origin. In such systems it is necessary, of course, to either automatically or manually take into account the 90 degree difference in direction of the nulls of the loop and combined antenas.

Referring now to FIG. 3, therein is illustrated a radio direction finder system according to the invention, employing a mechanically rotated indicator. The shaft 30 of the motor 15 is provided with slip rings 31, 32, 33 and 34. On one end of the shaft 30 a pointer 35 is mounted for rotation with the shaft, and a second pointer 36 is also mounted on the end of the shaft but displaced 90 degrees from the pointer 35. The pointer 35 is provided with an indicating lamp 40 connected to slip rings 31 and 32, and the pointer 36 is provided with an indicating lamp 41 connected to slip rings 33 and 34. The slip rings 31 and 32 are connected by brushes 42 and 43, respectively, to one set 44 of terminals of a double-pole double-throw switch 45, and slip rings 33 and 34 are connected by brushes 46 and 47, respectively, to the other set 48 of terminals of the switch 45. The common terminals 49 of the switch 45 are connected to the amplifier 16.

In operation, assuming that the sensing antenna 17 is disconnected and the common terminals of switch 45 are connected to terminals 44, the output of the amplifier will be connected to the indicating lamp 40 by way of brushes 42 and 43 and slip rings 31 and 32. Due to the rotation of the antenna 11 by the motor 15, the DC output voltage developed in receiver 12 will vary cyclically. The peak detector 14 is poled to detect the null peaks of the receiver output voltage, and to apply a pulse to the amplifier 16 at each occurrence of such a null. The pulse signals applied by the amplifier 16 to the lamp 40 therefore light this lamp at each time during the rotation of the antenna that a null in the automatic gain control voltage is detected. It is apparent from FIG. 2(a) that the lamp 40 will be lit whenever the plane of the loop 11 is normal to the direction between the loop and the source of signals, and thus that the lamp will be lit twice during each revolution of the loop. The indicator 17 may be provided with a dial (not shown) positioned oriented with respect to the loop so that the pointer 35 continually indicates a direction normal to the plane of the loop, whereby the light 40 will be lit whenever the pointed indicates either the direction of origin of the signals or a direction opposite to the origin of the signals.

In order to indicate which of these two directions is correct, the sensing antenna 18 is connected to the receiver by means of switch 19, and the common terminals of switch 45 are connected to terminals 48, so that the pulsatory output of the amplifier 16 is applied to the lamp 41 by way of slip rings 33 and 34 and brushes 46 and 47. The amplifier 16 will now provide only a single pulse at each revolution of the loop antenna, as is apparent from FIG. 2(c), and since the pointer 36 is displaced 90 degrees from the pointer 35, the lamp 41 will be lit only when the pointer 36 indicates the actual direction of the origin of the received signals. The switch 45 may, of course, be mechanically coupled to the switch 19 in order to simplify the operation of the system.

FIG. 4 is a block diagram of an embodiment of the present invention employing a cathode ray tube as the indicator. In this system, the DC output voltage of the radio receiver appearing on line 13 may be amplified in amplifier 50 before application to the peak detector 14. The output signal of the peak detector is shaped and amplified to form suitable deflection pulses for the cathode ray tube by means of a squaring amplifier 51, an output amplifier 52, and a saturated transformer and clipper 53. The output of the saturated transformer and clipper 53 is applied to a sine-cosine potentiometer 54, which is continuously rotated by the motor 15 in unison with the loop antenna. The sine and cosine function outputs of the sine-cosine potentiometer are applied to a horizontal deflection amplifier 55 and a vertical deflection amplifier 56, respectively, the outputs of these amplifiers being applied to a 90 degree rotation relay 57, with the outputs of the rotation relay 57 being applied to the deflection plates of cathode ray tube 58. The rotation relay, which may be coupled to the switch 19 for connecting the sensing antenna to the receiver, serves to shift the pattern on the image of the cathode ray tube by 90 degrees, so that the image is in the correct position when the sensing antenna is employed.

A circuit which may be employed for the system of FIG. 4 is shown more completely in FIG. 5. This circuit is particularly adapted for portable use, such as on a small boat, wherein only a direct current source of power is available. In this circuit, a source 60 of direct voltage, for example 12 volts, is connected by way of a main switch 61 to the motor 15. The motor 15 is mechanically coupled to rotate the loop antenna 11 and the contacts of the sine-cosine potentiometer 54 in unison. The loop antenna 11 is coupled, by way of slip rings 62 and 63 to the input of the receiver 12. In order to facilitate mounting, the sensing antenna 18 may be positioned on the axis of the loop antenna. The sensing antenna is connected to the input of the receiver 12 by way of slip rings 64 and normally open contacts 65 of a relay 66.

Operating voltage for the cathode ray tube 58 and other tubes in the circuit may be provided by a transistor converter 67 of any conventional design supplied by the source 60. The converter 67 may be connected to a rectifier 68 having a positive direct voltage output on lead 69 of about 475 volts. In order that the operation of the circuit is not substantially affected by variation in the voltage of source 60, a regulator comprising a resistor 70 and Zener diode 71 may be serially connected to the source 60, with the regulated voltage on lead 72 connected to the junction of the resistor 70 and the diode 71 being about 9.1 volts.

The DC output voltage derived in the receiver 12 is applied to the grid of an amplifier tube 73 by way of a coupling capacitor 74 and grid resistor 75. The bias and filament current for the amplifier 73 are provided by means of resistors 76 and 77 connecting the filament to the line 72 and ground, respectively. The output signal of the amplifier 73 is developed across anode resistor 78, which is connected to the junction of voltage divider resistors 79 and 80 for supplying anode potential for the amplifier 73. The anode potential may be, for example, about 90 volts.

The amplified signal output of the amplifier 73 is coupled by capacitor 81 to the base of transistor 82 which is an emitter follower-peak detector. The base resistor 83 and emitter resistor 84 are connected to the supply line 72, and the emitter resistor is bypassed by a capacitor 85.

The input voltage to the peak detector, as shown in FIG. 6(a), is a cyclically varying potential in which the nulls are indicated by the negative peaks, due to the inversion of the signal in the amplifier 73. The negative going peaks of the signal at the base of transistor 82 cause conduction of emitter current in the transistor, and the capacitor 85 consequently becomes charged. The capacitor 85 has a sufficiently high capacitance that only a small proportion of the charge will be lost between adjacent null peaks. This provides an output voltage of transistor 82, as shown in FIG. 6(b), in which a positive peak occurs just before each null. The position of the positive peak is dependent upon the size of the capacitor 85 and emitter resistor 84.

The emitter voltage of the peak detector is coupled by a capacitor 90 to a squaring amplifier comprising direct coupled transistors 91 and 92 having collector resistors 93 and 94 respectively connected to ground, and emitter resistors 95 and 96 respectively connected to supply lead 72. A base resistor 97 for the transistor 91 is also connected to lead 72.

The output voltage from the squaring amplifier, which is coupled by capacitor 98 to the base of an output amplifier transistor 99, is a square wave, as shown in FIG. 6(c), in which the negative going leading edge occurs at the time of the positive peaks of the output as shown in FIG. 6(b) of the peak detector. The output transistor has a base resistor 100 and an emitter resistor 101 connected to the supply lead 72. The collector load of the transistor 99 comprises a resistor 102 in series with the primary winding of a transformer 103. The secondary winding of the transformer has a grounded center tap, and is connected to the sine-cosine potentiometer 54. A clipping diode 104 is connected in parallel with the secondary winding.

Since the input voltage to the transistor 99 is a square wave voltage, the collector current of this transistor will also be a square wave, and consequently the total collector voltage across the resistor 102 and primary winding of transformer 103 will be a square wave voltage. Due to the differentiating action of the primary winding and resistor, the voltage developed across the primary winding will be a voltage pulse with an exponentially decreasing trailing edge as shown in FIG. 6(d). The voltages developed at the opposite ends of the center-tapped secondary winding and applied to the potentiometer 54 are therefore positive and negative pulsatory voltages, as shown in FIGS. 6(e) and 6(f). The diode 104 serves to clip undesired signals from the trailing edges of these pulses.

The voltages at the two output taps of potentiometer 54, which are the sine and cosine functions of the pulsatory voltage applied to the potentiometer, are applied to the grids of horizontal and vertical amplifier tubes 110 and 111, respectively. The load resistors 112 and 113 of these tubes respectively are connected to the high voltage supply lead 69.

A rotation relay 120, connected in parallel with the sensing antenna relay 66, is selectively energized from the source 60 by a sensing switch 121. The relay 120 has three sets of double-throw contacts 122, 123, and 124. In the deenergized state of relay 120, the output of horizontal amplifier 110 is applied by way of coupling capacitor 125, contacts 123, and a resistor 126 to horizontal deflection plate 127 of cathode ray tube 58. The other horizontal plate 128 is permanently connected to the high voltage supply lead 69. The output of the vertical amplifier 111 is applied by way of capacitor 129 and contacts 124 to one of the vertical deflection plates 130, while the other vertical deflection plate 131 is connected to the supply lead 69 by way of contacts 122.

In the energized state of relay 120, the horizontal amplifier 111 is connected by way of capacitor 125 and contacts 122 to the vertical deflection plate 131, the other vertical deflection plate 130 is connected to the supply lead 69 by way of contacts 124, and the vertical amplifier 111 is connected by way of capacitor 129, contacts 123 and resistor 126 to horizontal plate 127. It is thus seen that energization of relay 120 shifts the image on cathode ray tube 58 by 90 degrees.

A resistor 140 connected between the center arms of contacts 122 and 124 serves to provide the same level of direct voltage at the two vertical plates, and the signal applied to these plates is developed across this resistor. A resistor 141 connected between the lead 69 and horizontal plate 127 provides the same direct voltage potential at the two horizontal plates, and resistor 141 in combination with resistor 126 form a voltage divider for the signal in order to compensate for the different deflection sensitivities of the horizontal and vertical plates.

Referring to FIG. 6, it is seen that the pulses at the output of the transformer 103 occur slightly before the actual nulls in the receiver DC output voltage. This error may be reduced by making the time constant of capacitor 85 and resistor 84 as long as practicable while retaining sufficient signal input amplitude for the squaring amplifier. If the rotation rate of the antenna is sufficiently constant, the error may also be corrected by a fixed angular displacement of the antenna with respect to the indicia on the cathode ray tube.

In operation, the cathode ray tube 58 potentials are adjusted in conventional manner to provide a spot in the center of the screen. When the relays 66 and 120 are deenergized, the pulsatory output from the amplifiers will produce the two radial traces on the screen displaced by 180 degrees. These two traces correspond to the nulls in the antenna reception pattern, and their angular position on the screen is determined by the positions of the taps on the sine-cosine potentiometer, and hence on the actual angular position of the loop antenna. The width of the traces is limited only by the characteristics of the cathode ray tube, so a sharp indication of direction may be obtained. When the relays 66 and 120 are energized by means of switch 121, the sensing antenna is connected to the receiver, and the image on the screen is shifted by 90 degrees. However, since the single null in the combined antenna pattern is 90 degrees from the two nulls in the loop antenna pattern, a single radial trace will occur on the screen in the direction of the actual origin of the signals. While this single trace does not provide an accurate indication of the direction, it does indicate which of the two traces is correct when only the loop antenna is employed.

As an example, a circuit according to FIG. 5 was constructed, and was found to satisfactorily indicate the direction of origin, of radio signals. The circuit had the following components:

| Component | | Value |
|---|---|---|
| Tube 58 | | DG-7-31 |
| Resistor 70 | ohms | 68 |
| Diode 71 | | OAZ 207 |
| Tube 73 | | 6977 |
| Capacitor 74 | mfd | 0.47 |
| Resistor 75 | megohm | 1 |
| Resistor 76 | ohm | 220 |
| Resistor 77 | do | 56 |
| Resistor 78 | do | 68K |
| Resistor 79 | do | 120K |
| Resistor 80 | do | 35K |
| Capacitor 81 | mfd | 0.47 |
| Transistor 82 | | 2N280 |
| Resistor 83 | ohm | 150K |
| Resistor 84 | do | 56K |
| Capacitor 85 | mfd | 10 |
| Capacitor 90 | mfd | 100 |
| Transistor 91 | | 2N280 |
| Transistor 92 | | 2N280 |
| Resistor 93 | ohm | 180K |
| Resistor 94 | do | 27K |
| Resistor 95 | do | 390 |
| Resistor 96 | do | 8.2K |
| Resistor 97 | do | 3.3K |
| Capacitor 98 | mfd | 10 |
| Transistor 99 | | 2N280 |
| Resistor 100 | ohm | 27K |
| Resistor 101 | do | 180 |
| Resistor 102 | do | 2.2K |
| Tube 110 | | 1/2 12AX7 |
| Tube 111 | | 1/2 12AX7 |
| Resistor 112 | ohm | 120K |
| Resistor 113 | do | 120K |
| Capacitor 125 | mfd | 0.47 |
| Resistor 126 | ohm | 470K |
| Capacitor 129 | mfd | 0.47 |
| Resistor 140 | megohm | 1.5 |
| Resistor 141 | do | 1 |

The present invention thus provides a simple, accurate and economical system for determining the direction of origin of radio signals, that may be employed in combination with a conventional receiver.

While the invention has been described with reference to a limited number of embodiments, it will be understood that it is not intended that the invention be limited to such embodiments, and that variations and modifications may be made without departing from the spirit and scope of the invention, and it is intended in the appended claims to cover all such variations and modifications.

What is claimed is:

1. A radio direction finding system comprising a loop antenna and a sensing antenna, a radio receiver connected to said loop antenna for providing a direct output voltage responsive to the signal strength of signals received by said loop antenna, means for continually rotating said loop antenna whereby said direct voltage has cyclic variations, means for peak detecting said direct voltage to provide a pulsatory signal responsive to peaks of said direct voltage, direction indicating means, means for applying said pulsatory signal to said indicating means, means connected to said direction indicating means responsive to the angular position of said loop antenna whereby said indicating means indicates the direction of origin of signals received by said loop antenna, means for selectively connecting said sensing antenna to said radio receiver, and means for displacing the indicating direction of said indicating means by 90 degrees when said sensing antenna is connected to said receiver.

2. A radio direction finding system comprising a loop antenna, means connected to said loop antenna for providing a direct voltage having a magnitude responsive to the signal strength of signals received by said loop antenna, means for continually rotating said loop antenna whereby said direct voltage has cyclic variations, peak detecting means, means applying said direct voltage to said peak detecting means for providing pulsatory signals responsive to peaks of said direct voltage, rotatable pointer indicating means, means for rotating said pointer means in synchronism with said loop antenna, lamp means on said pointer means, means applying said pulsatory signals to said lamp means whereby the position of said pointer means indicates the direction of origin of signals received by said loop antenna when said lamp means is lit by said pulsatory signals, a sensing antenna, means for selectively connecting said sensing antenna to said means for providing a direct voltage, second pointer indicating means mounted for rotation with said first-mentioned pointer means, second lamp means on said second pointer means, and means for removing said pulsatory signals from said first-mentioned lamp means and applying them to said second lamp means when said sensing antenna is connected to said means for providing a direct voltage, said second pointer means being displaced 90 degrees with respect to said first-mentioned pointer means.

3. A radio direction finding system comprising a loop antenna, means connected to said loop antenna for providing a direct voltage having a magnitude responsive to the signal strength of signals received by said loop antenna, means for continually rotating said loop antenna whereby said direct voltage has cyclic variations, peak detecting means, means applying said direct voltage to said peak detecting means, pulse forming means connected to said detecting means for providing pulsatory signals responsive to peaks of said direct voltage, cathode ray tube indicating means having an electron gun for directing an electron beam at a screen, and horizontal and vertical deflecting means for deflecting said beam, sine-cosine potentiometer means, means for rotating said potentiometer in synchronism with said loop antenna, means applying said pulsatory signals to said potentiometer means, means for deriving first and second pulse output signals from said potentiometer means that vary in amplitude as the sine and cosine respectively of the relative position of said loop antenna, means applying said first output signals to one of said horizontal and vertical deflecting means, means applying said second output signals to the other of said deflecting means, a sensing antenna, means for selectively connecting said sensing antenna to said means providing a direct voltage, and means for rotating the image on the screen of said cathode ray tube of 90 degrees when said sensing antenna is connected to said means providing a direct voltage.

References Cited

UNITED STATES PATENTS

| | | | |
|---|---|---|---|
| 2,232,096 | 2/1941 | Dane | 343—118 |
| 2,406,406 | 8/1946 | Sandretto et al. | 343—118 |
| 2,485,585 | 10/1949 | Goldstein | 343—118 |
| 2,563,998 | 8/1951 | Foster | 343—118 |
| 3,132,341 | 5/1964 | Fryklund | 343—118 X |

FOREIGN PATENTS

| | | |
|---|---|---|
| 435,674 | 9/1935 | Great Britain. |

RODNEY D. BENNETT, *Primary Examiner.*

CHESTER L. JUSTUS, *Examiner.*

R. E. BERGER, *Assistant Examiner.*